US011023335B2

(12) United States Patent
Takai et al.

(10) Patent No.: US 11,023,335 B2
(45) Date of Patent: Jun. 1, 2021

(54) COMPUTER AND CONTROL METHOD THEREOF FOR DIAGNOSING ABNORMALITY

(71) Applicant: OMRON Corporation, Kyoto (JP)

(72) Inventors: Masaichi Takai, Ritto (JP); Takamasa Mioki, Moriyama (JP)

(73) Assignee: OMRON Corporation, Kyoto (JP)

(*) Notice: Subject to any disclaimer, the term of this patent is extended or adjusted under 35 U.S.C. 154(b) by 152 days.

(21) Appl. No.: 16/219,905

(22) Filed: Dec. 13, 2018

(65) Prior Publication Data
US 2019/0272218 A1 Sep. 5, 2019

(30) Foreign Application Priority Data

Mar. 1, 2018 (JP) .............................. JP2018-036811

(51) Int. Cl.
G06F 11/14 (2006.01)
G06F 9/54 (2006.01)
G06F 11/07 (2006.01)
G06F 21/60 (2013.01)

(52) U.S. Cl.
CPC .......... *G06F 11/1471* (2013.01); *G06F 9/542* (2013.01); *G06F 11/079* (2013.01); *G06F 11/0757* (2013.01); *G06F 11/0778* (2013.01); *G06F 11/1438* (2013.01); *G06F 21/604* (2013.01); *G06F 2201/835* (2013.01); *G06F 2201/86* (2013.01); *G06F 2201/88* (2013.01)

(58) Field of Classification Search
CPC ............. G06F 11/0706; G06F 11/0721; G06F 11/0757; G06F 11/0778; G06F 11/079; G06F 11/1008; G06F 11/1064; G06F 11/141; G06F 11/1428; G06F 11/1441; G06F 11/147
See application file for complete search history.

(56) References Cited

U.S. PATENT DOCUMENTS 5,594,646 A * 1/1997 Itoh .................. B60T 8/885
701/33.6
5,668,726 A * 9/1997 Kondo .............. G05B 19/0428
701/115
6,438,462 B1 * 8/2002 Hanf .................. G06F 1/3203
340/693.4

(Continued)

FOREIGN PATENT DOCUMENTS

JP S61133465 6/1986
JP H10260861 9/1998

(Continued)

OTHER PUBLICATIONS

"Search Report of Europe Counterpart Application", dated Jul. 2, 2019, pp. 1-8.

(Continued)

*Primary Examiner* — Amine Riad
(74) *Attorney, Agent, or Firm* — JCIPRNET

(57) ABSTRACT

An abnormality of a computer is diagnosed accurately. A CPU writes an event log into an event log part. When a WDT detects an abnormality of the CPU, a backup part writes backup data into a backup data part. The backup part associates the event log with the backup data and adds a number of starts of the CPU to the backup data.

16 Claims, 5 Drawing Sheets

(56) References Cited

U.S. PATENT DOCUMENTS

| | | | |
|---|---|---|---|
| 7,310,747 B2* | 12/2007 | Lauterbach | G06F 11/2289 713/2 |
| 7,882,393 B2 | 2/2011 | Grimes et al. | |
| 8,024,607 B2* | 9/2011 | Ladd | H04L 43/0876 714/25 |
| 2005/0229020 A1* | 10/2005 | Goodman | G06F 11/0793 714/2 |
| 2008/0201616 A1 | 8/2008 | Ashmore | |
| 2009/0222633 A1* | 9/2009 | Miyajima | G06F 11/0778 711/162 |
| 2013/0086933 A1* | 4/2013 | Holtkamp | F25D 29/00 62/129 |
| 2015/0006978 A1* | 1/2015 | Tokunaga | G06F 11/3034 714/55 |
| 2017/0147422 A1 | 5/2017 | Koktan | |
| 2019/0243701 A1* | 8/2019 | Kurts | G06F 11/0757 |

FOREIGN PATENT DOCUMENTS

| | | |
|---|---|---|
| JP | 2008040698 | 2/2008 |
| JP | 2012003506 | 1/2012 |
| JP | 2013186623 | 9/2013 |
| JP | 2014081700 | 5/2014 |
| JP | 2017162337 | 9/2017 |

OTHER PUBLICATIONS

"Office Action of Japanese Counterpart Application," dated Mar. 23, 2021, with English translation thereof, p. 1-p. 5.

* cited by examiner

```
*** ## FPGA ***
*** # LogIndex ***
 00000016

*** # Start Time Data ***
 RTC  : Sat Nov 25 14:57:22 2017
 HPS  : 00000000CB47A7B2
 FPGA : 0000000066958350

"*** # CPU count, Log access ID, Report data, ID name ***"
                      •
                      •
                      •
```

FIG. 4

COMPUTER AND CONTROL METHOD THEREOF FOR DIAGNOSING ABNORMALITY

CROSS-REFERENCE TO RELATED APPLICATION

This application claims the priority benefit of Japan Application No. 2018-036811, filed on Mar. 1, 2018. The entirety of the above-mentioned patent application is hereby incorporated by reference herein and made a part of this specification.

BACKGROUND

Technical Field

The disclosure relates to a computer and a control method thereof.

Description of Related Art

It is known to monitor abnormalities of a computer with a watchdog timer (hereinafter abbreviated as "WDT") formed of hardware (for example, see Patent Document 1). Further, when an abnormality of a processor of the computer is detected by the WDT, it is known to back up various data from a volatile memory to a nonvolatile memory (for example, see Patent Document 2). The backed-up data may be written from the nonvolatile memory to the volatile memory for restoration or may be transmitted to a superordinate management device for analysis of the abnormality.

PATENT DOCUMENT(S)

[Patent Document 1] Japanese Laid-open No. 2008-040698
[Patent Document 2] Japanese Laid-open No. 2014-081700

It is possible that an event that causes an abnormality has occurred before the abnormality is detected, but has already disappeared when the abnormality is detected. In such cases, it is difficult to say that the backed-up data only is sufficient for diagnosing the abnormality.

An embodiment of the present disclosure is to diagnose an abnormality of a computer accurately.

SUMMARY

A computer according to embodiment of the present disclosure is a computer including a processor part and a nonvolatile storage part, and including an abnormality detection part detecting an abnormality of the processor part, and a backup part writing at least one part of information held by the computer into the nonvolatile storage part as backup information when the abnormality detection part detects the abnormality, wherein the processor part writes log information into the nonvolatile storage part, the log information including event information occurring in the processor part in a time series, wherein the backup part adds information for association to the backup information, the information for association being information for associating the log information with the backup information.

Further, a control method of a computer according to another embodiment of the present disclosure is a method of controlling a computer including a processor part and a nonvolatile storage part. The control method includes a step of writing log information into the nonvolatile storage part, the log information including event information occurring in the processor part in a time series, an abnormality detection step of detecting an abnormality of the processor part, and a backup step of writing at least one part of information held by the computer into the nonvolatile storage part as backup information when the abnormality is detected in the abnormality detection step, wherein the backup step is to add information for association to the backup information, the information for association being information for associating the log information with the backup information.

BRIEF DESCRIPTION OF THE DRAWINGS

FIG. 4 is a diagram illustrating, in text format, an example of an event log written into a flash memory by a CPU in the programmable controller.

DESCRIPTION OF THE EMBODIMENTS

Embodiments of the disclosure will be described in detail below.

§ 1 Application Example

Figure 1:
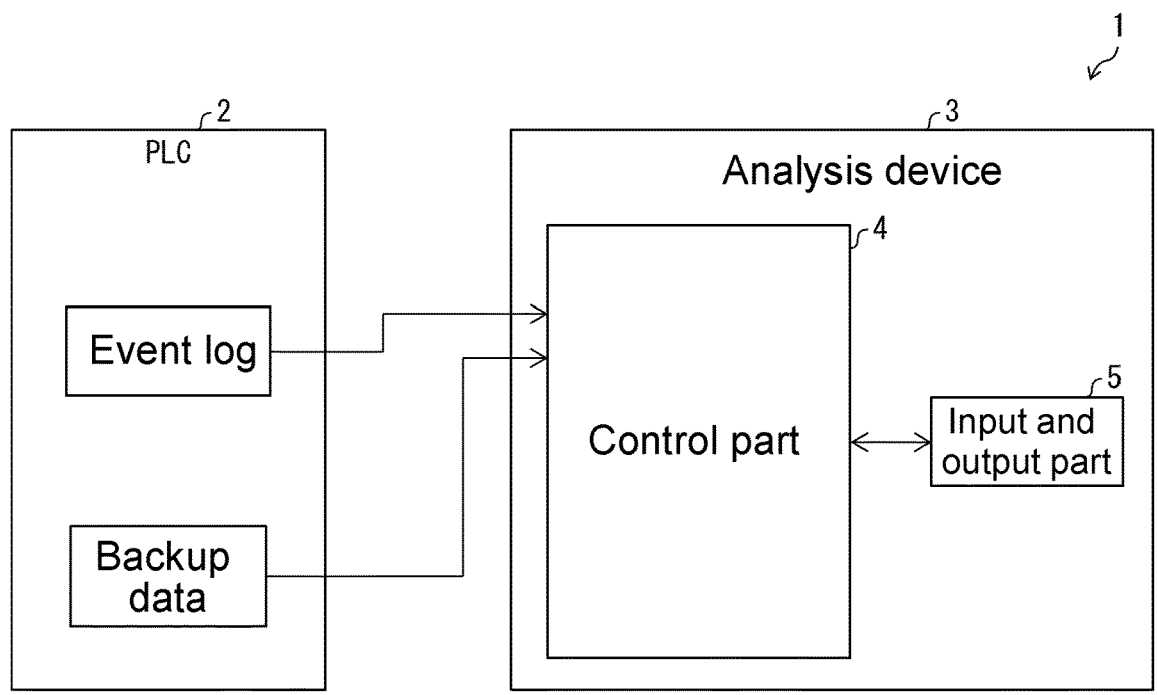
FIG. 1 is a schematic block diagram illustrating an example of a scene in which a diagnostic system of a programmable controller according to an embodiment of the disclosure is applied.

FIG. 1 is a schematic block diagram illustrating an example of a scene in which a programmable controller (programmable logic controller, hereinafter abbreviated as "PLC") diagnostic system according to the present embodiment is applied. As shown in FIG. 1, a PLC diagnostic system 1 includes a PLC 2 (computer) and a analysis device 3. In the PLC diagnostic system 1, when an abnormality occurs in the PLC 2, a user diagnoses the abnormality of the PLC 2 by analyzing various data by the analysis device 3. Examples of the diagnosis include identifying a cause of the abnormality, analyzing a probability of occurrence of the abnormality, etc.

When the abnormality occurs in the PLC 2, the user restarts the PLC 2 and connects the analysis device 3 to the PLC 2 through a cable such as a Universal Serial Bus (USB) cable, a local area network (LAN) cable and the like. Then, necessary data is acquired from the PLC 2 and analysed in the analysis device 3 to carry out a diagnosis of the PLC 2.

As shown in FIG. 1, the PLC 2 stores an event log (log information) and backup data (backup information). The event log includes event information occurring in the CPU 31 (see FIG. 3) of the PLC 2 in a time series. Further, the backup data is data obtained by backing up information necessary for the diagnosis when the abnormality of the CPU 31 of the PLC 2 is detected. Note that the details of the PLC 2 will be described later.

The analysis device 3 is formed of an ordinary personal computer (PC) and includes a control part 4 and an input and output part 5. The control part 4 comprehensively controls operation of various components in the analysis device 3, and is formed of, for example, a computer including a central processing unit (CPU) and a memory. The operation control of the various components is carried out by executing a control program by the computer.

The input and output part 5 carries out input and output of information with the user. The input and output part 5 includes an input and output device such as a touch panel, a display, etc.

As shown in FIG. 1, the control part 4 acquires the event log and the backup data from the PLC 2. The user appropriately associates the event log with the backup data and diagnoses the cause of the abnormality occurring in the PLC 2.

As described above, the PLC 2 adds information for association to the backup data, wherein the information for association is information for associating the event log with the backup data. Accordingly, the user can use the information for association to associate the event log with the backup data. That is, the user can diagnose the PLC 2 using not only the backup data that is data present at the time of detecting the abnormality but also the event log including the event information occurring in the CPU 31 in a time series. As a result, the PLC 2 can be diagnosed accurately.

In the present embodiment, the PLC 2 adds, to the backup data, a number of starts (information for association and start count information) which is a number of times the CPU 31 has been started. The number of starts is also usually included in the event log. Therefore, the control part 4 can associate the event log at and after a time point when the CPU 31 is started using the number of starts included in the backup data with the backup data.

Note that the PLC 2 may add, instead of the number of starts, a time stamp indicating date and time when the abnormality is detected to the backup data. In the event log, the date and time when the event occurred are usually included. Therefore, the control part 4 can associate the event log before the date and time indicated by the time stamp with the backup data. As a result, the PLC 2 can be diagnosed accurately.

Note that the PLC 2 may store a plurality of pieces of backup data respectively corresponding to a plurality of times of the abnormality recently detected. In this case, the control part 4 can acquire the plurality of pieces of the backup data from the PLC 2 and associate each of the plurality of pieces of the backup data with the event log. As a result, the PLC 2 can be diagnosed more accurately.

§ 2 Configuration Example

Figure 2:
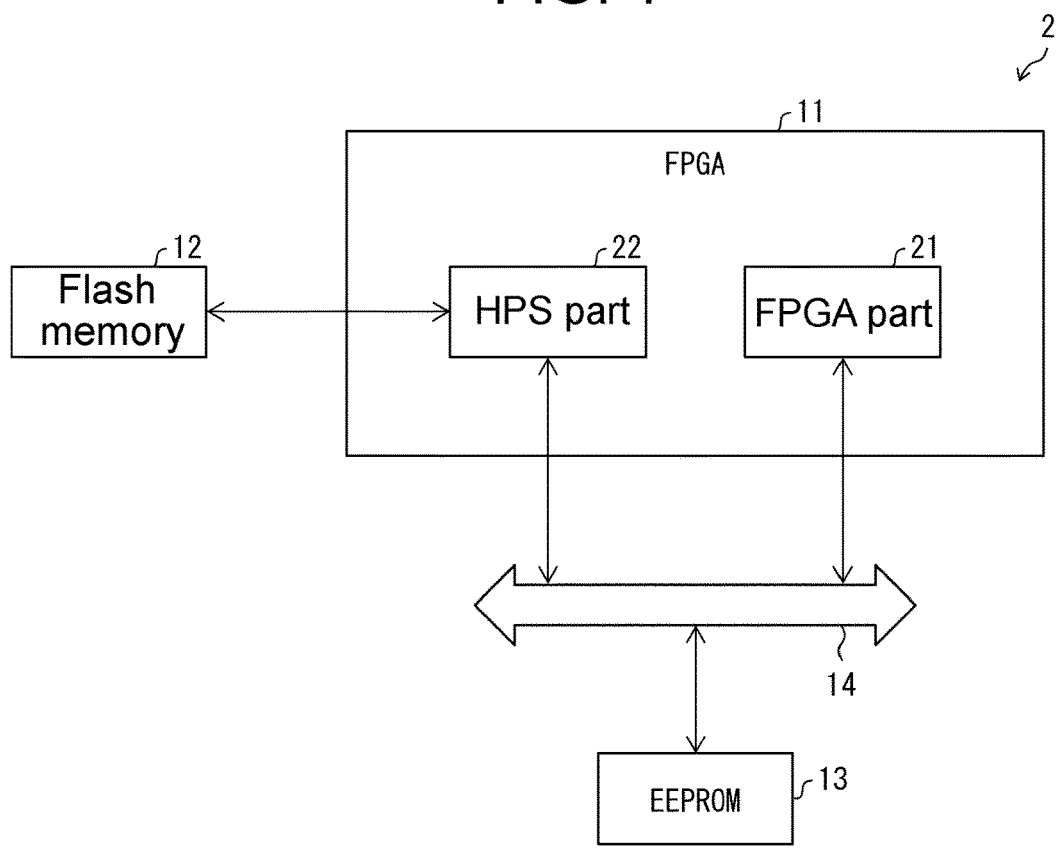
FIG. 2 is a circuit diagram illustrating an example of a hardware configuration of the programmable controller.

FIG. 2 is a circuit diagram showing an example of a hardware configuration of the PLC 2. The PLC 2 has built therein a microprocessor and controls a machine by a program which can be changed by the user. As shown in FIG. 2, the PLC 2 includes a field-programmable gate array (FPGA) 11, a flash memory (registered trademark) 12 (nonvolatile storage part), an electrically erasable programmable read-only memory (EEPROM, which is a registered trademark) 13 (nonvolatile storage part), and a bus 14.

The FPGA 11 is an integrated circuit whose configuration can be set by the user after being manufactured. In the present embodiment, the FPGA 11 is a system on a chip (SoC) type FPGA in which the functions of the PLC 2 are integrated in one chip. The FPGA 11 includes an FPGA part 21 that functions as an FPGA, and a hard processer system (HPS) part 22 (processor part) that includes a processor and controls the FPGA part 21.

The flash memory 12 and the EEPROM 13 are a type of rewritable nonvolatile memory. The flash memory 12 is accessible to the HPS part 22. The EEPROM 13 is accessible to the FPGA part 21 and the HPS part 22 through the bus 14.

Figure 3:
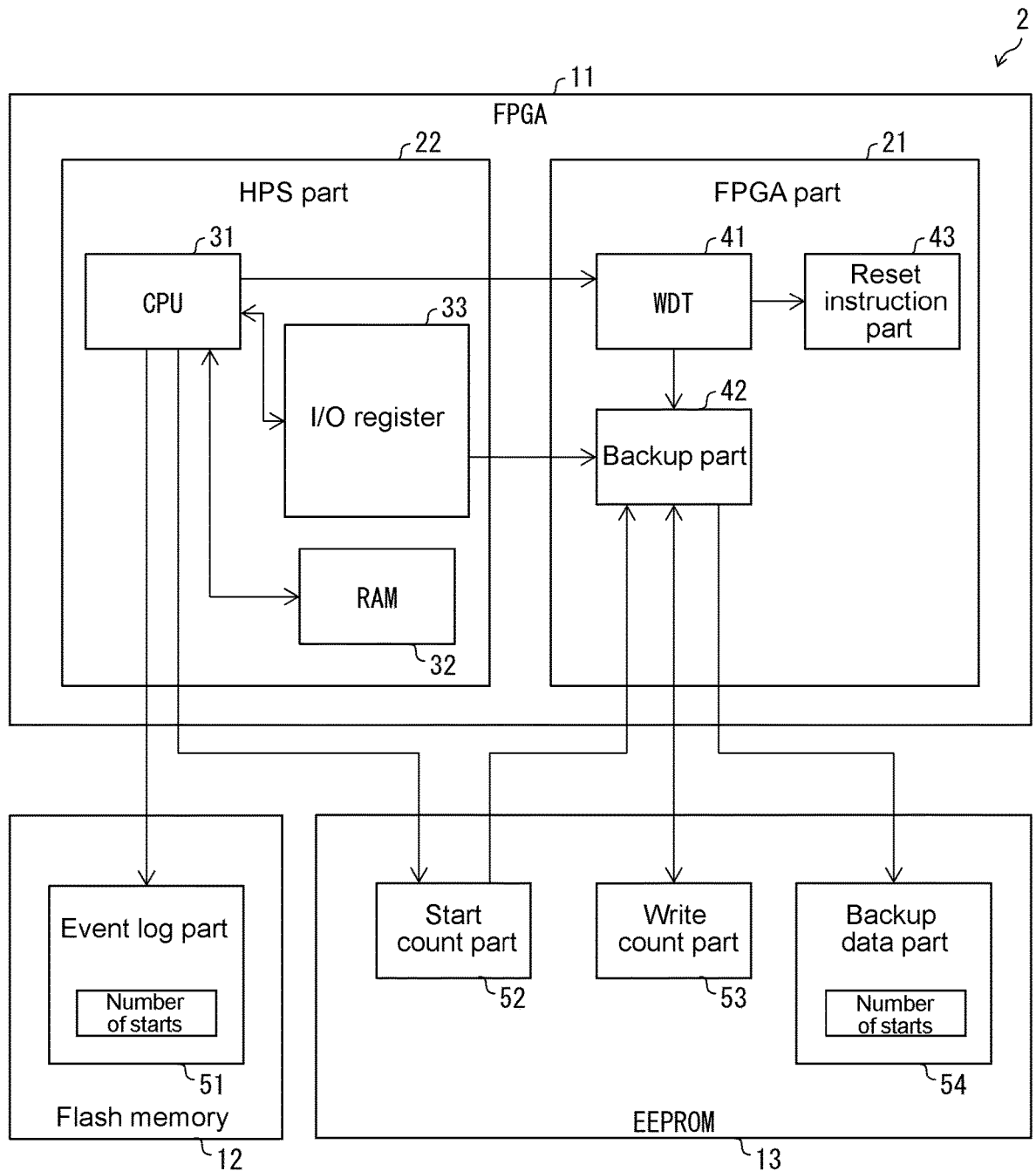
FIG. 3 is a block diagram illustrating an example of a detailed configuration of the programmable controller.

FIG. 3 is a block diagram showing an example of a detailed configuration of the PLC 2. As shown in FIG. 3, the HPS part 22 includes a CPU 31, a random-access memory (RAM) 32, and an input/output (I/O) register 33. The FPGA part 21 includes a WDT 41 (abnormality detection part), a backup part 42, and a reset instruction part 43 (reset part).

Incidentally, although it is necessary that the flash memory 12 be erased in units of blocks, the memory capacity of the flash memory 12 can be increased as compared to the EEPROM 13. On the other hand, the EEPROM 13 can rewrite old data simply by writing new data. Therefore, the flash memory 12 is used for writing a relatively large amount of data, and the EEPROM 13 is used for writing a relatively small amount of data at high speed.

Therefore, in the present embodiment, the flash memory 12 includes an event log part 51 into which an event log with a relatively large data amount is written. The event log includes event information occurring in the HPS part 22 in a time series. Further, the EEPROM 13 includes a start count part 52, a write count part 53, and a backup data part 54, into which the number of starts, a number of backup writes and the backup data, all with a relatively small data amount, are respectively written. The number of backup writes is a number of times the backup data has been written. Note that the details of the backup data will be described later.

Next, each component of the HPS part 22 will be described. The CPU 31 comprehensively controls operation of various components in the HPS part 22. The CPU 31 carries out the control by executing a control program stored in a ROM (not shown). The RAM 32 is a volatile memory and stores data such as a file for operation and a temporary file which is temporarily used by the CPU 31.

FIG. 4 is a diagram showing, in text format, an example of an event log written into the event log part 51 of the flash memory 12 after startup of the CPU 31. As shown in FIG. 4, the event log includes information (LogIndex) of log index. The information of log index is the information for association and is the number of starts (00000016) in the example of FIG. 4. At startup, the CPU 31 increments the number of starts and writes the number of starts into the event log part 51 of the flash memory 12. Furthermore, in the present embodiment, the CPU 31 also writes the number of starts into the EEPROM 13.

Further, the event log includes information (start time data) showing a record start time. In the example of FIG. 4, as the information showing the record start time, time information counted by each of a real time clock (RTC) that is not shown, the HPS part 22, and the FPGA part 21 is included.

Further, the event log is associated with a CPU count and an event ID (ID name). The CPU count corresponds to time of occurrence of an event, and the event ID identifies the event. Therefore, the user can grasp what event occurred at a certain time by referring to the event log.

The I/O register 33 is a register that is accessible to both the HPS part 22 and the FPGA part 21. Note that the I/O register 33 may be provided in the FPGA part 21.

Next, each component of the FPGA part 21 will be described. The WDT 41 is a device that monitors whether or not the CPU 31 is operating normally. The WDT 41 receives a signal (WDT clear signal) that is periodically transmitted from the CPU 31 and detects that some kind of abnormality (such as a program hangup or the like) is occurring in the CPU 31 by receiving no WDT clear signal when a predetermined period has passed. The WDT 41 notifies the backup part 42 and the reset instruction part 43 of the occurrence of the abnormality.

The backup part 42 creates the backup data when receiving the notification from the WDT 41. The backup part 42 writes the created backup data into the backup data part 54 of the EEPROM 13.

The reset instruction part 43 instructs a certain device to reset the HPS part 22 when receiving the notification from the WDT 41. Examples of the device include a reset IC of a power supply device. Accordingly, even if the HPS part 22 cannot be restarted due to the abnormality of the CPU 31, the HPS part 22 can be reliably restarted by the reset instruction part 43.

Figure 5:
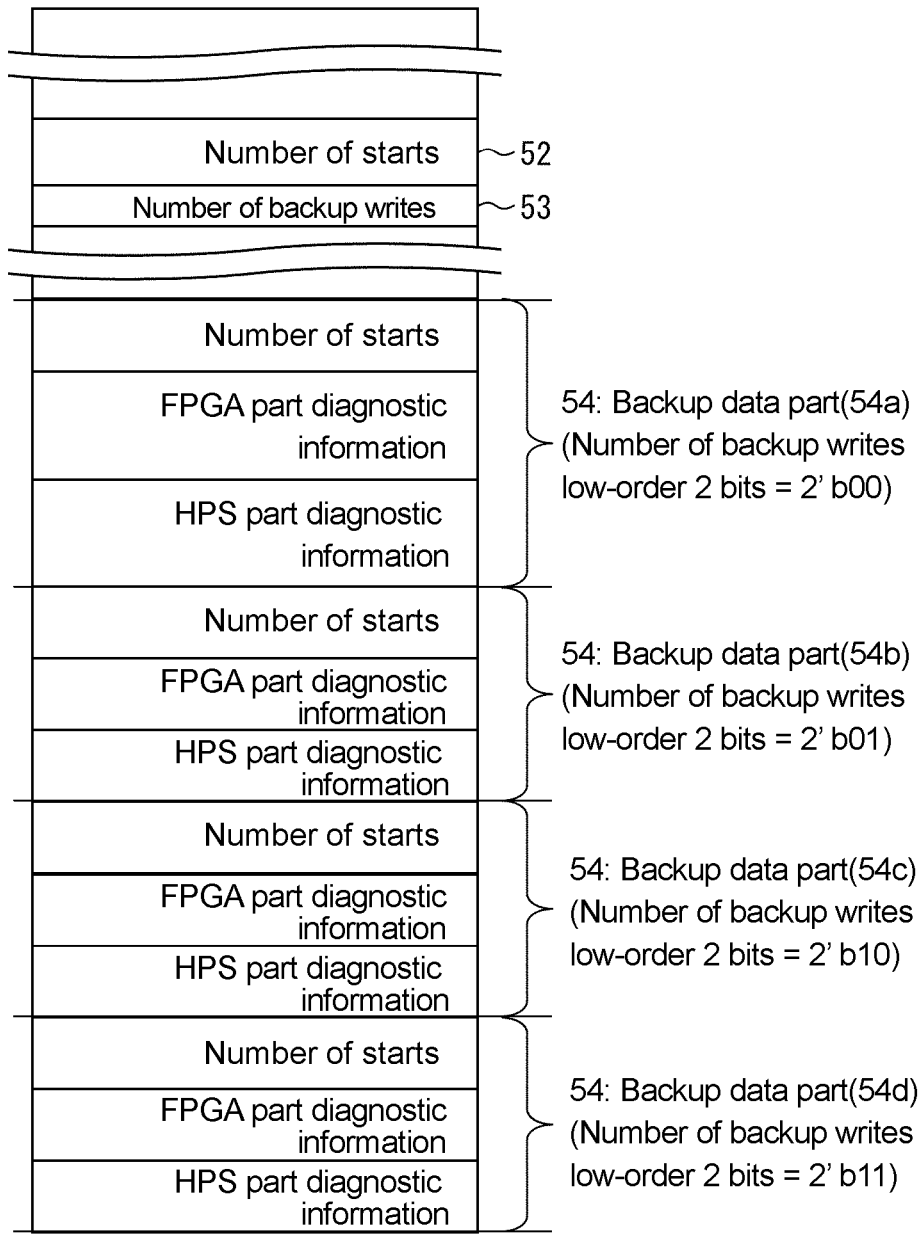
FIG. 5 is a diagram illustrating an example of a format of an electrically erasable programmable read-only memory (EEPROM) in the programmable controller.

FIG. 5 is a diagram showing an example of a format of the EEPROM 13. In the example of FIG. 5, the EEPROM 13 includes the start count part 52, the write count part 53, and four backup data parts 54. The number of starts stored in the start count part 52 is 2 bytes of data and is written from the CPU 31 as described above.

The number of backup writes stored in the write count part 53 is 1 byte of data. The backup part 42 reads the number of backup writes from the write count part 53 when creating the backup data. Further, when writing the created backup data into the backup data part 54 of the EEPROM 13, the backup part 42 increments the number of backup writes and writes the number of backup writes into the write count part 53 of the EEPROM 13.

In addition, the backup part 42 changes the backup data part 54 into which the backup data is written based on the number of backup writes read from the EEPROM 13. Specifically, when the low-order 2 bits of the number of backup writes are "00", "01", "10", and "11", the backup data is written into a first backup data part 54a to a fourth backup data part 54d, respectively. Accordingly, the latest (the most recent) four pieces of backup data can be stored in the EEPROM 13.

In addition, as shown in FIG. 5, the backup data stored in each of the backup data parts 54 includes the number of starts, FPGA part diagnostic information, and HPS part diagnostic information.

The FPGA part diagnostic information is data of a predetermined size, is necessary information for diagnosing the PLC 2 by the analysis device 3 when the abnormality of the CPU 31 is detected, and is information that can be collected by the FPGA part 21. Examples of the FPGA part diagnostic information include an operating state of an internal module of the FPGA part 21, a state of an external signal, etc.

The HPS part diagnostic information is data of a predetermined size, is necessary information for diagnosing the abnormality by the analysis device 3 when the abnormality of the CPU 31 is detected, and is information that can be collected by the HPS part 22. That is, the HPS part diagnostic information is at least one part of the information held by the HPS part 22. The HPS part diagnostic information is defined by software executed by the CPU 31 and is stored in the I/O register 33. Accordingly, the backup part 42 of the FPGA part 21 can acquire the HPS part diagnostic information.

§ 3 Operation Example

Figure 6:
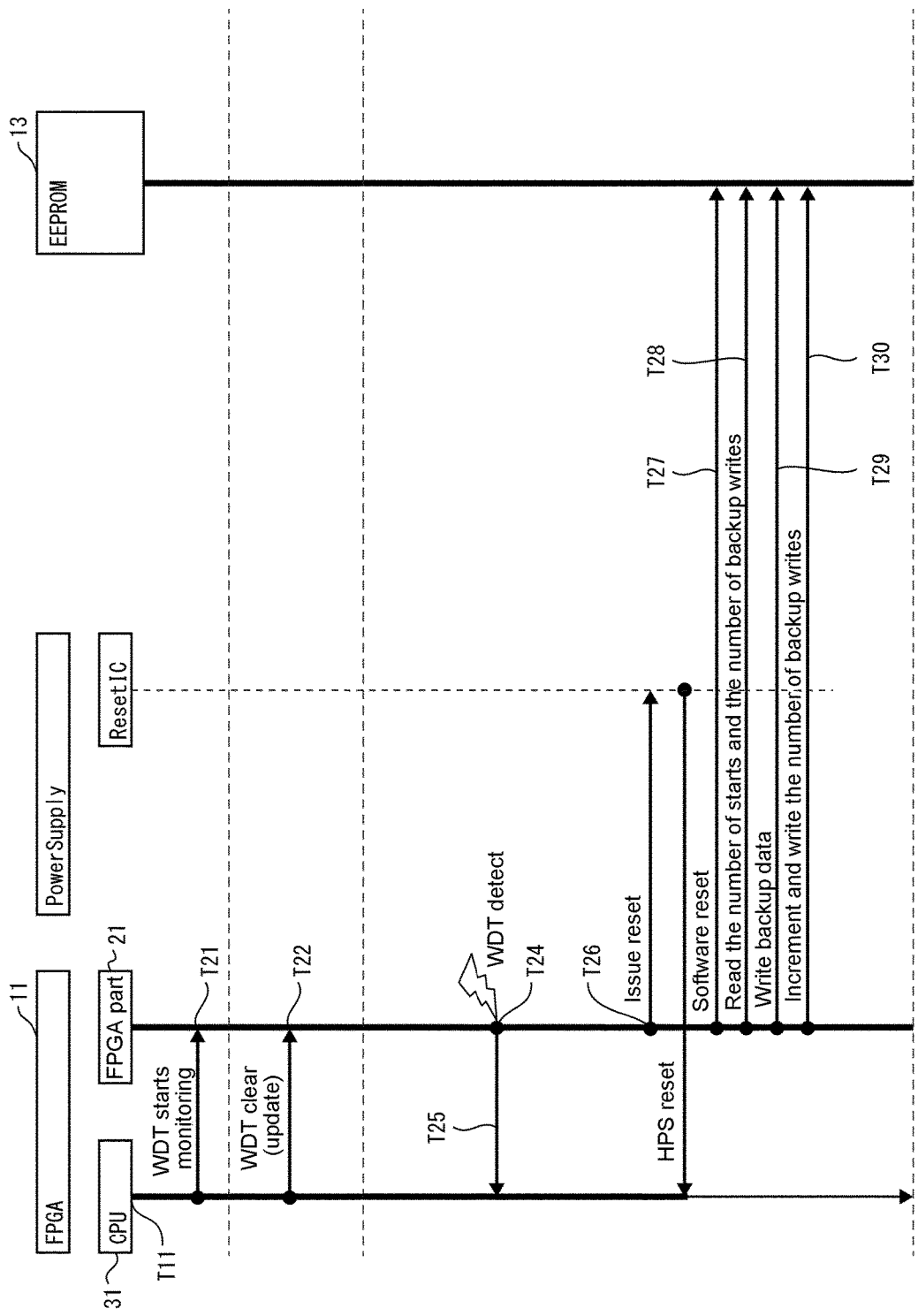
FIG. 6 is a sequence diagram illustrating an example of operation in the programmable controller.

FIG. 6 is a sequence diagram showing an example of the operation in the PLC 2. First, when started (T11), the CPU 31 writes the number of starts into the start count part 52 of the EEPROM 13. Next, the WDT 41 starts monitoring the CPU 31 (T21). That is, if the WDT 41 has received the WDT clear signal again during a predetermined period after receiving the WDT clear signal, the WDT 41 determines that no abnormalities occur in the CPU 31 (T22). On the other hand, if the WDT 41 has not received the WDT clear signal again during the predetermined period after receiving the WDT clear signal, the WDT 41 determines that an abnormality occurs in the CPU 31 (T24). Accordingly, the backup part 42 accesses the I/O register 33 in the HPS part 22 to acquire the HPS part diagnostic information (T25). In addition, the backup part 42 collects the FPGA part diagnostic information from the FPGA part 21.

Next, the reset instruction part 43 transmits a reset signal that is a reset instruction to a reset IC (ResetIC) of a power supply part (PowerSupply) (T26). Accordingly, the HPS part 22 is reset.

Next, the backup part 42 initiates a software reset of the EEPROM 13 through the bus 14 (see FIG. 2) (T27). The following is the reason.

That is, it is possible that an abnormality occurs in the CPU 31 when the CPU 31 is accessing the EEPROM 13. In this case, a problem may occur that the backup part 42 cannot write the backup data into the EEPROM 13.

Therefore, when determining that an abnormality has occurred in the CPU 31, the backup part 42 initiates a software reset of the EEPROM 13. Accordingly, an access right to the EEPROM 13 is reset, and the backup part 42 can reliably write the backup data into the EEPROM 13 as described later.

Note that instead of performing the above step T27, the backup part 42 may instruct a controller (not shown) of the bus 14 to reset the bus 14. In addition, the above step T27 may be omitted. The reason is that in this case, since the HPS part 22 is reset in step T26, the above problem is eventually solved.

Next, the backup part 42 reads the number of starts and the number of backup writes from the EEPROM 13 (T28) and creates the backup data including the number of starts, the FPGA part diagnostic information and the HPS part diagnostic information. Next, the backup part 42 writes the created backup data into an area in the backup data part 54 of the EEPROM 13 based on the number of backup writes (T29). Then, the backup part 42 increments the number of backup writes and writes the number of backup writes into the write count part 53 of the EEPROM 13 (T30).

As described above, at startup (T11), the CPU 31 writes the number of starts into the start count part 52 of the EEPROM 13, and when the abnormality occurs in the CPU 31, the backup part 42 reads the number of starts from the EEPROM 13 (T28) to add the number of starts to the backup data. Accordingly, even if the abnormality occurs in the CPU 31, the backup part 42 can acquire information of the number of starts held by the CPU 31. Therefore, the number of starts can reliably be added to the backup data.

§ 4 Modification

Note that in the present embodiment, the backup part 42 may include, instead of the number of starts, the time stamp indicating the date and time when the abnormality is detected in the backup data. In this case, it is unnecessary for the CPU 31 to write the number of starts into the EEPROM 13. On the other hand, the data amount of the number of starts is 2 bytes as in the example of FIG. 5, but the time stamp is usually 4 bytes. Therefore, it is necessary to increase the data amount of the backup data part 54.

Further, in the present embodiment, the PLC 2 is used as an object to be diagnosed by the analysis device 3, but the disclosure is not limited thereto. The disclosure is applicable to an arbitrary electronic device including a CPU, such as a coupler for Ethernet (registered trademark) for Control Automation Technology (EtherCAT), etc.

Further, in the present embodiment, although the PLC 2 transmits the event log and the backup data based on a request from the analysis device 3, the PLC 2 may automatically transmit the event log and the backup data to a server via a communication network such as the Internet, etc. In this case, the analysis device 3 may acquire the event log and the backup data from the server and may not be connected to the PLC 2 via the cable.

Implementation Example by Software

A control block (especially the control part 4, the CPU 31, and the backup part 42) of the PLC 2 and the analysis device 3 may be achieved by a logic circuit (hardware) formed by an integrated circuit (IC chip), etc., or may be achieved by software.

In the latter case, the PLC 2 and the analysis device 3 include a computer executing commands of a program which is software that realizes each function. The computer includes, for example, one or more processors, and a computer-readable recording medium that stores the program. In the computer, the operations of the disclosure is achieved by the processor reading the program from the recording medium and executing the program. As the processor, for example, a CPU can be used. As the recording medium, a "non-transitory tangible medium", for example, in addition to a ROM, a tape, a disk, a card, a semiconductor memory, a programmable logic circuit, etc., can be used. Further, a RAM and the like for developing the program may further be included. Moreover, the program may be supplied to the computer through an arbitrary transmission medium (a communication network, a broadcast wave, etc.) capable of transmitting the program. Note that in an embodiment of the disclosure, the program can also be achieved in the form of a data signal embedded in a carrier wave which is embodied by electronic transmission.

According to the above configuration and method, the information for association that is information for associating the log information with the backup information is added to the backup information. Therefore, when the computer is diagnosed, it is possible to use not only the backup information that is information at the time of detecting the abnormality of the processor part but also the log information that includes the event information occurring in the processor part in a time series. As a result, the abnormality of the computer can be diagnosed accurately.

Note that the backup information is information necessary for diagnosing the computer, such as information showing an operation state of the computer.

In the computer, the information for association may be start count information showing a number of times the processor part has been started. The start count information is usually included in the log information at startup of the processor part. Therefore, it is possible to associate the log information at and after a time point when the computer is started using the number of starts with the backup information.

Incidentally, the start count information is information held by the processor part. Hence, if the abnormality occurs in the processor part, there is concern that the start count information may be unavailable. Therefore, the processor part stores the start count information in the nonvolatile storage part at startup, and the backup part reads the start count information from the nonvolatile memory part and adds the start count information to the backup information when the abnormality detection part detects the abnormality. Accordingly, the start count information can reliably be added to the backup information.

In the computer, a time stamp indicating date and time when the abnormality is detected may be present. The log information usually includes date and time when the event occurred. Therefore, it is possible to associate the log information before the date and time indicated by the time stamp with the backup information.

Incidentally, the processor part may not be restarted due to the abnormality. Therefore, the computer may further include a reset part restarting the processor part when the abnormality detection part detects the abnormality. In this case, the processor part can reliably be restarted.

In the computer, a plurality of pieces of backup information respectively corresponding to a plurality of times of the abnormality recently detected by the abnormality detection part may be written into the nonvolatile storage part. In this case, it is possible to associate each of the plurality of pieces of the backup information with the log information. Therefore, since the computer can be diagnosed using the log information and the plurality of pieces of the backup information, the abnormality of the computer can be diagnosed more accurately.

Incidentally, it is possible that when the processor part accesses the nonvolatile storage part, the abnormality occurs in the processor part. In this case, it is possible that the backup part cannot write the backup information into the nonvolatile storage part.

Therefore, after resetting an access right to the nonvolatile storage part, the backup part may write the backup information into the nonvolatile storage part. In this case, the backup part can reliably write the backup information into the nonvolatile storage part.

Note that a method of resetting the access right to the nonvolatile storage part includes restarting the processor, resetting the processor part and a bus provided between the backup part and the nonvolatile storage part, resetting operation of the nonvolatile storage part, etc.

According to an embodiment of the present disclosure, an effect that the abnormality of the computer can be diagnosed accurately is achieved.

The disclosure is not limited to each of the above-mentioned embodiments, various modifications are possible within the scope indicated in the claims, and embodiments obtained by appropriately combining technical means disclosed respectively in different embodiments are also included in the technical scope of the disclosure.

What is claimed is:

1. A computer comprising a processor part, a first nonvolatile storage part and a second nonvolatile storage part, the computer comprising:
    an abnormality detection part that detects an abnormality of the processor part; and
    a backup part that writes backup information held by the computer into the first nonvolatile storage part when the abnormality detection part detects the abnormality, wherein
    the processor part writes log information into the second nonvolatile storage part, the log information comprising event information occurring in the processor part in a time series, and the backup information includes diagnostic information which is information necessary for the diagnosis when the abnormality of the processor part is detected, and information for association which is information for associating the log information with the backup information and the information for association is start count information showing a number of times the processor part has been started.

2. The computer according to claim 1, wherein
the processor part stores the start count information in the first nonvolatile storage part at startup, and
the backup part reads the start count information from the first nonvolatile storage part and adds the start count information to the backup information when the abnormality detection part detects the abnormality.

3. The computer according to claim 2, further comprising a reset part restarting the processor part when the abnormality detection part detects the abnormality.

4. The computer according to claim 2, wherein a plurality of pieces of backup information respectively corresponding to a plurality of times of abnormality recently detected by the abnormality detection part is written into the first nonvolatile storage part.

5. The computer according to claim 2, wherein the backup part writes the backup information into the first nonvolatile storage part after resetting an access right to the first nonvolatile storage part.

6. The computer according to claim 1, wherein the information for association is a time stamp indicating date and time when the abnormality is detected.

7. The computer according to claim 6, further comprising a reset part restarting the processor part when the abnormality detection part detects the abnormality.

8. The computer according to claim 6, wherein a plurality of pieces of backup information respectively corresponding to a plurality of times of abnormality recently detected by the abnormality detection part is written into the first nonvolatile storage part.

9. The computer according to claim 6, wherein the backup part writes the backup information into the first nonvolatile storage part after resetting an access right to the first nonvolatile storage part.

10. The computer according to claim 1, further comprising a reset part restarting the processor part when the abnormality detection part detects the abnormality.

11. The computer according to claim 10, wherein a plurality of pieces of backup information respectively corresponding to a plurality of times of abnormality recently detected by the abnormality detection part is written into the first nonvolatile storage part.

12. The computer according to claim 10, wherein the backup part writes the backup information into the first nonvolatile storage part after resetting an access right to the first nonvolatile storage part.

13. The computer according to claim 1, wherein a plurality of pieces of backup information respectively corresponding to a plurality of times of abnormality recently detected by the abnormality detection part is written into the first nonvolatile storage part.

14. The computer according to claim 13, wherein the backup part writes the backup information into the first nonvolatile storage part after resetting an access right to the first nonvolatile storage part.

15. The computer according to claim 1, wherein the backup part writes the backup information into the first nonvolatile storage part after resetting an access right to the first nonvolatile storage part.

16. A control method of a computer, wherein the computer comprises a processor part, a first nonvolatile storage part and a second nonvolatile storage part, the control method comprising:
a step of writing log information into the second nonvolatile storage part, the log information comprising event information occurring in the processor part in a time series;
an abnormality detection step of detecting an abnormality of the processor part; and
a backup step of writing backup information held by the computer into the first nonvolatile storage part when the abnormality is detected in the abnormality detection step, wherein
the backup information includes diagnostic information which is information necessary for the diagnosis when the abnormality of the processor part is detected, and information for association which is information for associating the log information with the backup information and the information for association is start count information showing a number of times the processor part has been started.

* * * * *